B. ERBE.

Reversible Knob-Latches.

No. 5,913. Reissued June 16, 1874.

WITNESSES
Frederick Standish
James L. Kay

INVENTOR
Barthel Erbe
by Bakewell & Clark
Attorneys

AM. PHOTO-LITHOGRAPHIC CO. N.Y. (OSBORNE'S PROCESS.)

UNITED STATES PATENT OFFICE.

BARTHEL ERBE, OF PITTSBURG, PENNSYLVANIA.

IMPROVEMENT IN REVERSIBLE KNOB-LATCHES.

Specification forming part of Letters Patent No. 87,096, dated February 23, 1869; reissue No. 5,913, dated June 16, 1874; application filed May 6, 1874.

*To all whom it may concern:*

Be it known that I, BARTHEL ERBE, of Pittsburg, in the county of Allegheny and State of Pennsylvania, have invented a new and useful Improvement in Reversible Knob-Latches; and I do hereby declare the following to be a full, clear, and exact description thereof.

My invention relates to that class of door-latches called "reversible," but is only applicable to what are technically called "rim-latches," but not to mortise-latches. It consists in constructing the external case so that one of the bearings of the square latch-head may be removed sufficiently, without disconnection from the case, to permit the reversal the latch.

To enable others skilled in the art to make use of my invention, I will now describe a lock-case constructed so as to embody and utilize my invention.

Figure 1:
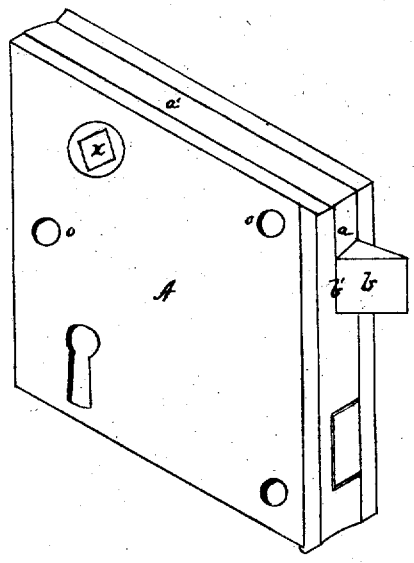
Figure 2:
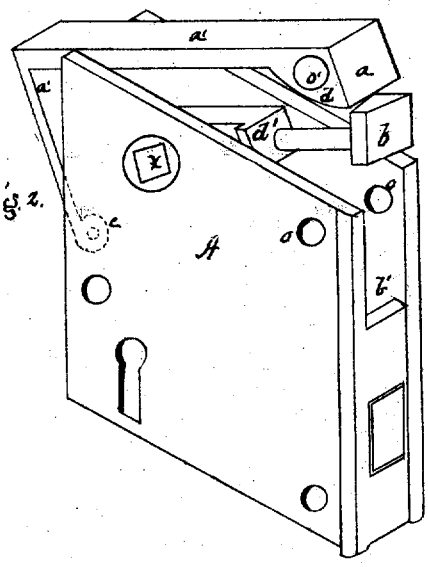

Figure 1 is a perspective view of the lock referred to when ready to apply to the door; and Fig. 2 is a like view of the same, illustrating the peculiar construction of my invention.

Like letters of reference indicate like parts in each.

The square latch-head *b* projects through the ordinary square opening *b'* in the front edge of the lock. It is connected with the yoke *d'* by a swivel-joint, so that it may be revolved on its longitudinal axis, for the purpose of presenting the bevel side either to the right or left. In order to permit the revolution of the head *b* it is necessary to remove one of its bearings. Heretofore this was done by taking off the side of the case. *a* represents the removable bearing of the latch-head *b*. The bearing *a* is attached to the rim *a'*, which is hinged at *c*, so that when the latter is thrown back on the pivot *c* the head *b* is free on one side. The latch-head may then be raised sufficiently to clear the other bearings in turning, its hub or follower-connection permitting such movement. The rim *a'* is provided with a projection, *d*, which extends down into the case when closed, and which is fitted with a screw-hole, *o'*. When the rim *a'* is closed the holes *o* and *o'* coincide, and the attachment-screw holds the rim *a'* securely in place as a part of the case.

The axial movement of the latch I do not claim as new; nor do I claim, broadly, removing a portion of the case of a lock to permit the reversal of the latch-head, since that has heretofore been done by taking the cap-plate off of the side of the lock.

What I claim as my invention, and desire to secure by Letters Patent, is—

A reversible rim-latch having the portion of the case which forms one of the bearings of the latch-head removably attached thereto, so that it may be partially removed without disconnection therefrom for the purpose of reversing the latch-bolt, and so that when replaced the said portion will hold the latch-bolt in its set position.

In witness whereof I, the said BARTHEL ERBE, have hereunto set my hand.

BARTHEL ERBE.

Witnesses:

W. N. PAXTON,

JAMES I. KAY.